United States Patent
Bashir et al.

(10) Patent No.: US 12,049,340 B2
(45) Date of Patent: Jul. 30, 2024

(54) MULTI-CUP ARRANGEMENT FOR FOODSTUFF PACKAGING

(71) Applicant: SABIC GLOBAL TECHNOLOGIES B.V., Bergen Op Zoom (NL)

(72) Inventors: Zahir Bashir, Riyadh (SA); Rajiva Joshi, Nashik (IN); Azzedine Kioul, Riyadh (SA); Fayez Abdullah Alfayez, Riyadh (SA); Abdul Rahim Ahamed Arafath, Richmond (CA)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 288 days.

(21) Appl. No.: 17/269,371

(22) PCT Filed: Aug. 27, 2019

(86) PCT No.: PCT/EP2019/072761
§ 371 (c)(1),
(2) Date: Feb. 18, 2021

(87) PCT Pub. No.: WO2020/043687
PCT Pub. Date: Mar. 5, 2020

(65) Prior Publication Data
US 2021/0179311 A1    Jun. 17, 2021

(30) Foreign Application Priority Data
Aug. 27, 2018  (EP) .................... 18190939

(51) Int. Cl.
*B65D 1/30* (2006.01)
*B29C 51/32* (2006.01)
(Continued)

(52) U.S. Cl.
CPC .............. *B65D 1/30* (2013.01); *B29C 51/325* (2013.01); *B29C 59/007* (2013.01);
(Continued)

(58) Field of Classification Search
CPC .... B65D 1/30; B65D 81/3294; B29C 51/325; B29C 59/007; B29C 2793/0054; B29K 2023/12; B29L 2031/7132
(Continued)

(56) References Cited

U.S. PATENT DOCUMENTS 5,409,127 A * 4/1995 Stratford .................. B65D 1/30
220/23.6
6,440,509 B1 * 8/2002 Littlejohn .............. A47G 19/03
229/407
(Continued)

FOREIGN PATENT DOCUMENTS

EP    2353717 A1    8/2011
JP    10180909 A    7/1998
(Continued)

OTHER PUBLICATIONS

International Search Report; International Application No. PCT/EP2019/072761; International Filing Date: Aug. 27, 2019; Date of Mailing: Oct. 23, 2019; 4 pages.
(Continued)

*Primary Examiner* — Chun Hoi Cheung
(74) *Attorney, Agent, or Firm* — CANTOR COLBURN LLP (57) ABSTRACT

The present invention provides a multi-cup arrangement comprising a polypropylene sheet, wherein the polypropylene sheet comprises at least two cavities, the cavities each protruding from the sheet from a bottom surface of the sheet, wherein the cavities are separated from each other via one or more spacer area(s) on the sheet, wherein the spacer area(s) each comprise one or more groove(s) on the bottom surface of the sheet that are positioned to allow the sheet to be broken along the groove by bending the sheet towards the top surface, wherein the grooves are positioned to divide the sheet into multiple segments, each segment comprising one
(Continued)

or more cavities, wherein each of the groove(s) has a maximum depth of ≥25% and ≤80% with regard to the thickness of the polypropylene sheet. Such multi-cup arrangement may be separated into individual cup segments by moderate manual force, whilst the arrangement does not undesirably bend nor snap under the action of its own weight.

19 Claims, 3 Drawing Sheets

(51) Int. Cl.
  *B29C 59/00* (2006.01)
  *B29K 23/00* (2006.01)
  *B29L 31/00* (2006.01)
  *B65D 81/32* (2006.01)

(52) U.S. Cl.
  CPC .. *B65D 81/3294* (2013.01); *B29C 2793/0054* (2013.01); *B29K 2023/12* (2013.01); *B29L 2031/7132* (2013.01)

(58) Field of Classification Search
  USPC .............. 206/5.1, 528–540; 220/23.4, 23.2
  See application file for complete search history.

(56) References Cited

U.S. PATENT DOCUMENTS

| | | | | |
|---|---|---|---|---|
| 6,523,686 | B1* | 2/2003 | Bae | B65D 1/30 206/820 |
| 7,549,551 | B2* | 6/2009 | Tyberghein | B65D 1/30 220/23.4 |
| 7,845,147 | B2* | 12/2010 | Henderson | B29C 43/02 53/591 |
| 8,399,079 | B2* | 3/2013 | Rosell-Uriz | C08L 23/12 525/240 |
| 10,807,782 | B2* | 10/2020 | Sanfilippo | B26D 3/085 |
| 11,420,355 | B2* | 8/2022 | González | B65H 49/328 |
| 2006/0032765 | A1* | 2/2006 | Morhard | B65D 1/22 206/769 |
| 2006/0186014 | A1* | 8/2006 | Ramanujam | B65D 43/0212 206/508 |
| 2007/0095719 | A1* | 5/2007 | Colavito | B31D 5/0021 206/561 |
| 2009/0166369 | A1* | 7/2009 | Savicki | B65D 43/0218 220/781 |
| 2010/0003435 | A1* | 1/2010 | Oysaedm | C08L 23/0815 525/240 |
| 2012/0258307 | A1 | 10/2012 | Cretekos et al. | |
| 2016/0251133 | A1* | 9/2016 | Ferry | B65D 5/5495 206/558 |
| 2020/0199310 | A1* | 6/2020 | Basheer | B29C 71/0063 |
| 2021/0154962 | A1* | 5/2021 | González | B26D 3/08 |

FOREIGN PATENT DOCUMENTS

| | | | |
|---|---|---|---|
| WO | 2016049127 | A1 | 3/2016 |
| WO | 2016200363 | A1 | 12/2016 |
| WO | 2018065259 | A1 | 4/2018 |
| WO | WO-2018202602 | A1 * | 11/2018 ............. B29C 51/00 |

OTHER PUBLICATIONS

Written Opinion; International Application No. PCT/EP2019/072761; International Filing Date: Aug. 27, 2019; Date of Mailing: Oct. 23, 2019; 7 pages.

* cited by examiner

MULTI-CUP ARRANGEMENT FOR FOODSTUFF PACKAGING

CROSS REFERENCE TO RELATED APPLICATIONS

This application is a national stage application of International Application No. PCT/EP2019/072761, filed Aug. 27, 2019, which claims priority to European Application Serial No. 18190939.1, filed Aug. 27, 2018, both of which are incorporated by reference in their entirety.

The present invention relates to a multi-cup arrangement for packaging, such as for foodstuff or medicine packaging. The invention also relates to a polypropylene sheet for use in such multi-cup arrangement.

In certain packaging applications, such as for example in packaging of dairy products, there is a desire to package multiple quantities of the products together in one package. In such way, several individual portions of the products may be sold in a single package. For example, such package may comprise 2, 4, 6 or 8 or such individual portions.

Particularly, it is preferred that the individual portions are combined into one package in such way that the segments of the package are connected, and may be separated by the customer on his desire to retrieve a single portion from the package. A particularly desirable way by means of which this is done is by providing a sheet of thermoplastic material, into which cavities are introduced by for example thermoforming. During the packaging process, these cavities are filled with the product, and covered with for example an adhesive film to close the segments each comprising the individual, product-filled cavities.

In order for the consumer to be able to retrieve an individual portion from the package, the segments comprising the portions of the product need to be easily separate from each other. To achieve this, the area where the segments are to be separated may for example be an area that is able to snap; that is, an area where the sheet may be broken into the individual segments along a pre-defined path. Such pre-defined path may be introduced into the sheet by the provision of one of more grooves into the sheet, allowing the customer to break the package along the grooves. Such grooves are also referred to as pre-cuts. The grooves may be continuous or perforated. In the context of the present invention, a segment may be understood as identifying an area of the sheet demarcated by the outer edge(s) of the sheet and one or more groove(s).

In order for the package to break along the grooves in a predictable way, the material in the area of the groove needs to be such that it snaps when the consumer bends the package along the groove. Snapping by twisting or tearing is not desirable as the package separation becomes difficult for the consumer. The crack induced by the snapping must also run as much as possible along the pre-cuts, so that it will not run into the product-containing cavities, resulting in spillage of product. It is also desired that the package is sufficiently strong so that it does not break along the grooves under the influence of its own weight.

In the art, such snappable packages are produced from polystyrenes, in particular from mixtures of general-purpose atactic polystyrene and high-impact, rubber modified polystyrene. However, in view of industry drivers such as recyclability of polymers and product health and safety, as well as the fragility of the filled polystyrene cups, as a result of which they may break under their own weight, there currently exists a need to seek other materials for such package applications.

In non-snappable packages, such as for example packages comprising per unit only a single product-containing cavity, at present polypropylene and polyethylene terephthalate resins are being introduced. Such single-cup packages have a disadvantage that they need to be placed in an additional secondary package for transportation and handling.

A further driver in the field of multi-cup package arrangements for foodstuffs is the implementation of Form-Fill-Seal (FFS) packaging lines by the foodstuff manufacturer. An FFS production line typically combines the continuous, in-line production of the multi-cup arrangement and the filling thereof with the good to be packaged into a single line, for example starting from a thermoplastic sheet material. This allows for a reduction of scrap material.

In FFS, typically a roll of thermoplastic sheet material is fed into the machine. The sheet is heated, for example to above $T_g$, for example by contact heating, to soften the sheet. The heated sheet is moved along into a thermoforming zone comprising moulds for shaping the sheet to contain cavities having the desired cup form. The formed cups may be provided with labels or stickers on the outer side. The cups are joined together by certain undeformed areas of the sheet, referred to as bridges. The cups are transported forward to a filling station, where the product is introduced into the cavities. A film is placed on top of the cups and heat sealed to form a lid. A punch then introduces grooves in the bridge areas and cuts the formed cups into arrangements of the desired number of cups. The intersection where four cups connect is punched out to form a hole, for example a diamond-shaped hole.

The multi-cup arrangements produced in such packaging lines are snappable into individual segments by bending them upwards, i.e. in the direction opposite of the cups. The purpose of the grooves is to induce snapping with a small manual force that an average customer can exert comfortably. When snapping, the crack should run only along the pre-cut without deviating into the cup and causing leakage of content. Snapping typically occurs when bent at an angle of up to 90°. The multi-cup arrangement should not break under its own weight when picked by a customer holding one corner of the arrangement.

In using alternative thermoplastic materials, the requirements that are imposed on the package still remain. That includes the requirements for easy snappability of the segments on bending in the direction opposite the cups, whilst being able to withstand breakage when bending in the direction of the cups. The bending it the direction of the cups may commonly be only a few degrees as the cups collide, but in this bending, the cups should not break due to the fill weight. So, in order to qualify as material to be used in such packages, any material must be able to be converted into an arrangement that allows to be snapped as and when desired.

In addition, nowadays customer a looking more and more for transparent packaging allowing them to see trough and identify the cotenant.

Therefor there is a need for an alternative snappable thermoformable packaging with a balance of property between snappability, chock resistance, flexibility and manufacturing costs and preferentially with high transparency.

This has now been achieved by the present invention, which provides a multi-cup arrangement comprising a polypropylene sheet, wherein the polypropylene sheet comprises at least two cavities, the cavities each protruding from the sheet from a top surface toward a bottom surface of the sheet, wherein the cavities are separated from each other via one or more spacer area(s) on the sheet, wherein the spacer area(s) each comprise one or more groove(s) on the bottom surface of the sheet that are positioned to allow the sheet to be broken along the groove by bending the sheet towards the top surface, wherein the grooves are positioned to divide the sheet into multiple segments, each segment comprising one or more cavities, wherein each of the groove(s) has a maximum depth of 25% and 80% with regard to the thickness of the polypropylene sheet.

Surprisingly, the applicant discovered that a polypropylene sheet is only able to be snapped when the sheet is bending in the opposite direction of the groove. Therefore, the snapping capability is only unidirectional when the polypropylene sheet has only groove(s) on a side of the sheet and multidirectional when it have grooves on both side of the sheet.
This capability allows the polypropylene sheet, in non-limitative embodiment where the groove(s) is (are) with only on one side of the sheet, to be able to support more strength than other material. Therefore, when the sheet according to the invention is use to form holding cup, the cavities can hold heavier weight without take the risk of intentional snapping as the weight will been the sheet in the direction of the groove.

Another embodiment according to the invention is a multi-cup arrangement comprising a polypropylene sheet, wherein the polypropylene sheet comprises between 0.04 wt % to 0.08 wt % of advanced nucleating agents.

Advance nucleating agents are chemical compounds or compositions that enable faster nucleation or a higher crystallization temperature of thermoplastic polymers, resulting in improved mechanical and physical properties of articles made from such thermoplastics.

These compounds provide nucleation sites for crystal growth during cooling of a thermoplastic molten composition. In polypropylenes, for example, a higher degree of crystallinity and more uniform crystalline structure is obtained by adding a nucleating agent such as talc and carboxylate salts, e.g. sodium benzoate, phosphate esters, carboxylic acid or a combination thereof salts, preferentially phosphate esters, carboxylic acid or a combination thereof salts.

However, it is commonly recognized that the use of nucleating agents is a highly unpredictable technology area. Small changes in a molecular structure of the nucleating agents can drastically alter the ability of a nucleating agent to nucleate effectively a polymer composition. There are still many unknowns regarding the effect of a nucleating agent on polymer morphology during (re-)crystallization of thermoplastics.

In addition, nucleating agents add clarity to the sheet, allowing it to enhance its transparency. Furthermore, the use of advance nucleating agents result in productivity gains during their processing as they need less time to be cooled in order to be manipulated, decreasing the product general manufacturing costs (time, energy and money).

In a further embodiment, the advanced nucleating agent is nucleating agents is preferentially chosen from the group comprising phosphate esters, for example NA-11 and NA-21 from Asahi-Denka Kogyo (ADEKA), carboxylic acid for example HPN-68 from Milliken or a combination thereof salts.

Such multi-cup arrangement may be separated into individual cup segments by moderate manual force, whilst the arrangement does not undesirably snap under the action of its own weight. Such arrangement allows for the use of polypropylene as replacement from polystyrene whilst providing at least the same quality in terms of use of the package, combined with the advantages of polypropylene over polystyrene. For example, multi-cup arrangements comprising a polypropylene sheet may be subjected to higher temperatures during their processing and use, allowing for example to employ such package arrangements for hot-fill packages, and allowing for such package to be used in for example microwave ovens for heating the contents.

Preferably, the groove(s) have a maximum depth of ≥40% and ≤80%. The maximum depth of the groove is to be understood to be the distance between the surface of the sheet and the deepest point in the groove. Typically, the grooves are V-shaped grooves, wherein the deepest point of the groove then corresponds with the vertex of the groove. The groove depth may be expressed as the depth of the groove relative to the thickness of the sheet.

An embodiment of the present invention also relates to a package comprising the multi-cup arrangement according to the invention.

The cavities in the multi-cup arrangement of the present invention may for example be formed by thermoforming. Suitable types of thermoforming processes that may be employed are for example vacuum forming or pressure forming, and may be plug assisted, which are processes that are well known to the person of skill. The arrangement may for example comprise more than two cavities, such as 4, 6 or 8 cavities. Each cavity may have the same volume, or alternatively the volume of various cavities in a single arrangement may differ from each other. Each cavity may have a volume of for example 25-200 ml, for example 50-150 ml.

In a further embodiment, the present invention also relates to a polypropylene sheet for preparing a thermoformed object comprising a top surface and a bottom surface, wherein the sheet comprises one or more groove(s) on the bottom surface that are positioned to allow the sheet to be broken along the groove by bending the sheet towards the top surface, wherein each of the groove(s) has a maximum depth of 25% and 80% with regard to the thickness of the polypropylene sheet.

It is preferred that the polypropylene sheet has a thickness of ≥500 and ≤2500 μm. For example, the polypropylene sheet may have a thickness of ≥1000 μm and ≤2500 μm, or ≥500 μm and ≤2000 μm, or ≥1000 μm and ≤2250 μm, or ≥1000 μm and ≤2000 μm.

In the multi-cup arrangement of the present invention, it is preferred that each of the groove(s) has a width at the surface of the sheet of ≥100 μm and ≤250 μm. Such grooves are understood to contribute to the manual snappability of the arrangements, whilst avoiding snapping due to fill weight. Preferably, the groove(s) have a width at the surface of the sheet of ≥150 μm and ≤250 μm, or ≥100 μm and ≤200 μm.

The groove(s) preferably are straight lined grooves, which is also understood to contribute to the snappability under exertion of moderate manual force.

The multi-cup arrangement may in a particular embodiment of the invention further comprise groove(s) on the top surface positioned opposite the groove(s) on the bottom surface, preferably wherein the groove(s) on the top surface have a maximum depth of ≥25% with regard to the thickness of the polypropylene sheet. The presence of such groove(s) on the top surface may contribute to more accurate snapping along the groove(s) when the arrangement is manually separated into individual segments.

In a particular embodiment of the invention, the polypropylene sheet comprises ≥2.0 and ≤20.0 wt % of inorganic filler, with regard to the total weight of the polypropylene sheet. The presence of such filler contributes to the predictability of the snapping in a straight line along the groove(s). When such inorganic filler is present in the polypropylene sheet, in such quantities, the snapping tends to occur without propagation of cracks into the product-containing cavities. Preferably, the polypropylene sheet comprises ≥2.0 and ≤10.0 wt % of inorganic filler, more preferably ≥2.0 and ≤5.0 wt % of inorganic filer. It is preferable that the inorganic filler is selected from calcium carbonate, titanium dioxide and talc. Particularly preferably, the polypropylene sheet comprises ≥2.0 and ≤20.0 wt % of inorganic filler wherein the inorganic filler is selected from calcium carbonate, titanium dioxide and talc, more preferably ≥2.0 and ≤10.0 wt %, even more preferably ≥2.0 and ≤5.0 wt %. Particularly, the polypropylene sheet may comprise ≥2.0 and ≤20.0 wt % of inorganic filler wherein the inorganic filer is calcium carbonate, more preferably ≥2.0 and ≤10.0 wt %, even more preferably ≥2.0 and ≤5.0 wt %. Alternatively, the polypropylene sheet may comprise ≥2.0 and ≤20.0 wt % of inorganic filler wherein the inorganic filer is talc, more preferably ≥2.0 and ≤10.0 wt %, even more preferably ≥2.0 and ≤5.0 wt %. Alternatively, the polypropylene sheet may comprise ≥2.0 and ≤20.0 wt % of inorganic filler wherein the inorganic filer is titanium dioxide, more preferably ≥2.0 and ≤10.0 wt %, even more preferably ≥2.0 and ≤5.0 wt %.

Figure 1:
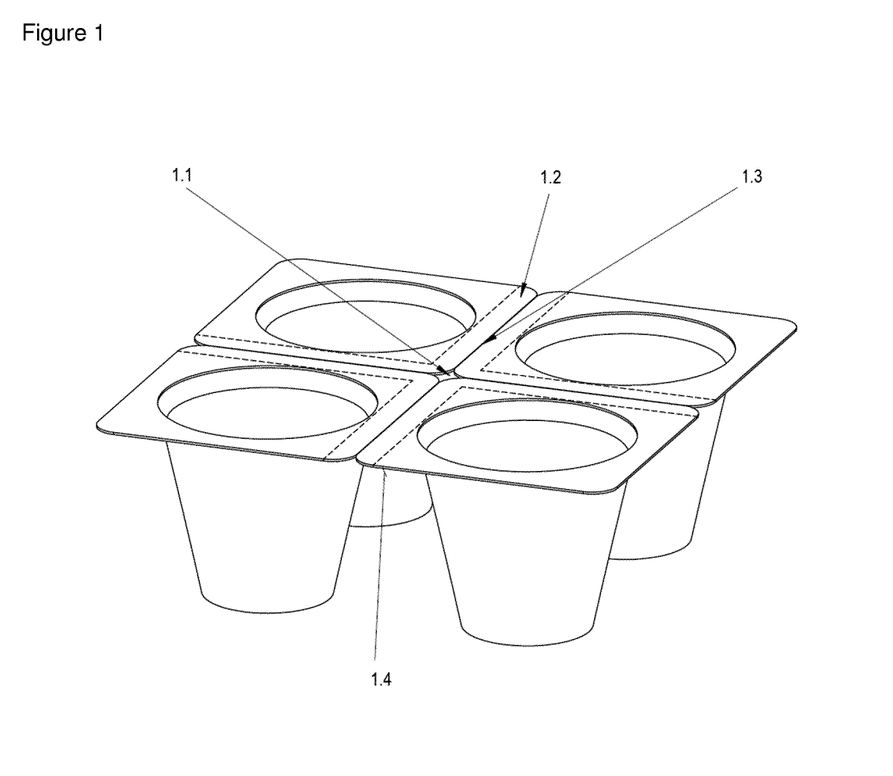
Figure 2:
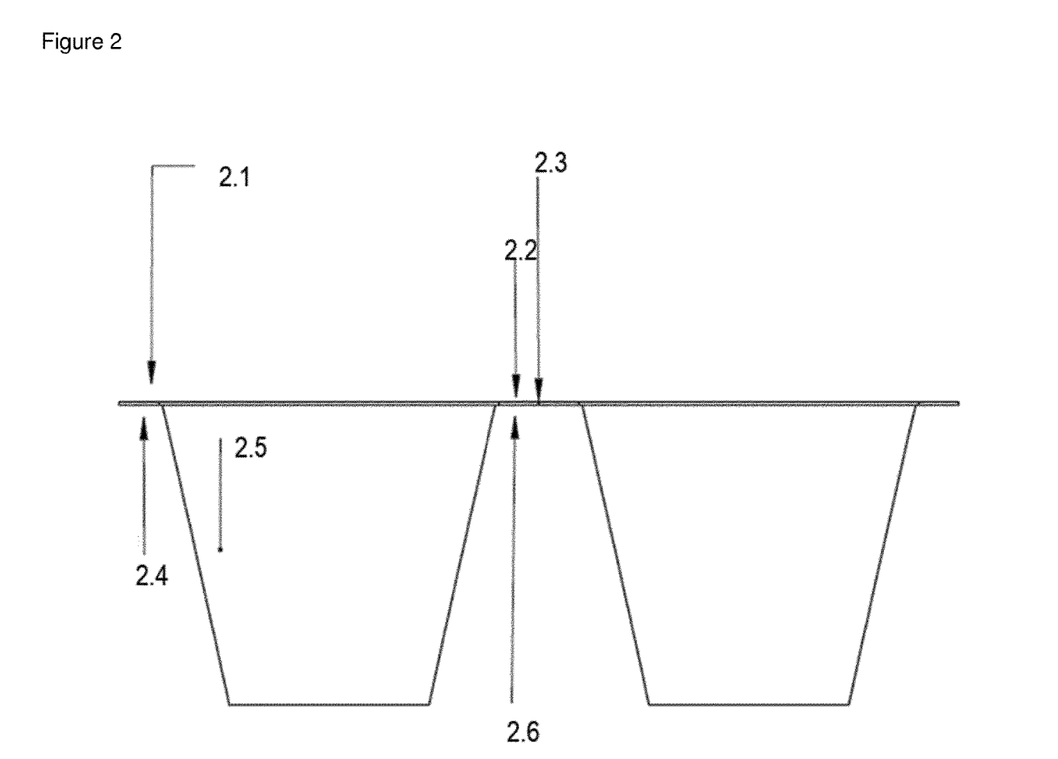
Figure 3:
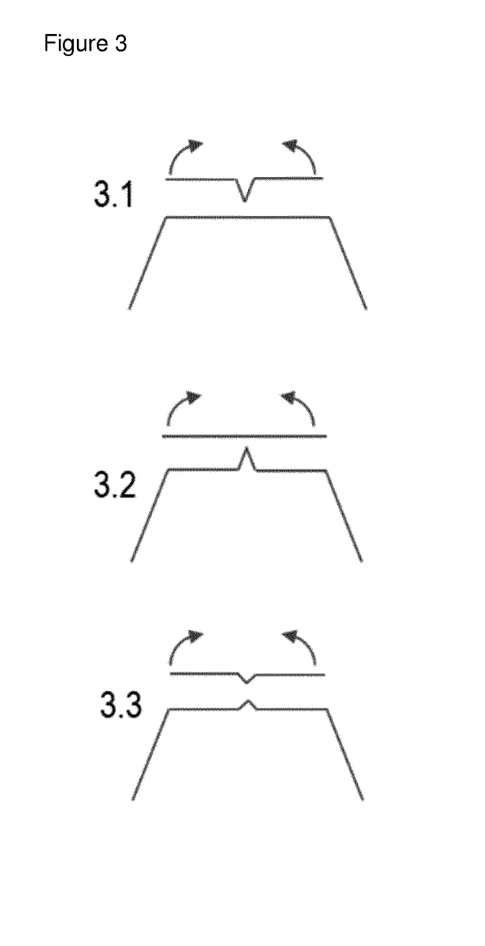

The multi-cup arrangement of the present invention is in certain of its embodiments presented in FIGS. 1-3.

FIG. 1 presents an exemplary arrangement in the form of a four-cup assembly. In FIG. 1, 1.1 presents a diamond-shaped punched-out hole on the intersection of the segments; 1.2 shows the bridge that connects the segments on the side of the top surface of the polypropylene sheet, which may also be referred to as the second surface; 1.3 shows the position of grooves between the segments; and 1.4 shows bridge area on the side of the bottom surface of the sheet, also referred to as the first surface.

FIG. 2 presents a view of an exemplary arrangement from the side, wherein 2.1 is the second or top surface; 2.2 is the bridge area from the top or second surface; 2.3 is the position of a groove between the segments; 2.4 is the first or bottom surface; 2.5 is a cup cavity; and 2.6 is the bridge area from the first or bottom surface.

FIG. 3 presents various groove configurations according to the prior art and the invention. The arrows in FIG. 3 indicate the direction of bending to snap the arrangement into separate segments. In 3.1, a configuration is presented with a groove in the top surface, such as used in polystyrene multi-cup arrangements according to the prior art; in 3.2, a configuration is presented with a groove in the bottom surface; in 3.3, a configuration is presented with a groove in both the top and the bottom surface, positioned opposite each other.

In the prior art, that is polystyrene multi-cups, a single groove is punched on the top side of the bridge, after cup forming and sealing, through the sealing foil. The groove length is typically 5.2 cm; this is length of two adjoining cups up to the start of the central cut out. The groove depth is 20-45% deep. The PS sheet is typically 1000 μm, so the groove depth is typically 200-450 μm deep. Anything deeper with PS would make the multi-cup assembly even more fragile and prone to breaking under the filled weight if lifted from a corner.

Polypropylene multi-cups on the other hand are not snappable if the grooving is done from the top side of the bridge. The PP cups which have been grooved from the top side of the sheet/bridge form a non-breakable hinge when folded upwards. The PP has a lower modulus, and when the sheet is folded in the upwards direction, after the faces of the groove meet, the remainder of the PP sheet bends inwards, and does not deliver a sharp impact blow to the bottom of the groove to enable snapping.

It was now found that with PP if the groove is placed on the bottom side of the bridge connecting the cups, the cups can be snapped in the usual way, that is, by swinging the downwards-hanging cups upwards along the groove on the bottom side of the bridge, as presented in FIG. 3. The PP sheet would be for example 1.1 mm thick and the groove depth on the underside of the bridge will be typically 25-80% of this.

Optionally, one can have grooves on the top and bottom of the bridge as in FIG. 3. A groove on the bottom of the bridge is essential to snap the PP multi-cups by swinging upwards. If a single sealing foil is used to cover all the cups, then the arrangement with top and bottom grooving is preferable for PP. If double sided grooving is used, the groove depths can be 25% from both sides.

There are several embodiments for the method of grooving the bottom of the bridge. The single sided or double sided groove may be cut by any method, including punching, cutting with a rotating blade, or with a moving laser, or by moulding it into the bridge during thermoforming. One can have a combination of grooves and perforations. The groove placed on the underside of the sheet may be created by any method, before heating and thermoforming. In another embodiment, the groove is placed during the thermoforming of the sheet; the heated sheet is placed over the mould and vacuum is applied, and in the bridge area, a V shaped indentation is present which leads to a groove on the bottom side of the bridge. The second groove can be punched the normal way on the top side of the bridge through the sealed foil, after the filling.

As with the multi-cup arrangement of the present invention grooves are to be positioned on the surface of the polypropylene sheet from which also the cavities for filling with product protrude, it is preferred that the grooves are introduced into the sheet prior to forming of the cavities. For example, the grooves may be introduced into the sheet by means of a cutting tool, followed by forming the cavities by thermoforming.

The polypropylene sheet according to the invention and comprised in the multi-cup arrangement according to the invention preferably comprises at least 70.0 wt % of polypropylene with regard to the total weight of the polypropylene sheet, more preferably at least 80.0 wt %, more preferably at least 90.0 wt %, even more preferably at least 95.0 wt %.

In a certain embodiment, the polypropylene sheet consists of polypropylene and optionally at most 1.0 wt % of additives, with regard to the total weight of the polypropylene sheet. Suitable additives may for example be selected from antioxidants as for example (Irganox 1010, Irgafos 168), UV stabilisers, acid scavenger and/or deactivates metal component from catalyst (as for example Calcium Stearate or DHT4V) and mould release agents.

In a certain different embodiment, the polypropylene sheet consists of polypropylene, ≥2.0 and ≤20.0 wt % of inorganic filler, preferably calcium carbonate, and optionally at most 1.0 wt % of additives, with regard to the total weight of the polypropylene sheet.

The polypropylene may for example have a melt mass-flow rate as determined in accordance with ASTM D1238 (2013) at 230° C. under a load of 2.16 kg of ≥1.0 g/10 min and ≤10.0 g/10 min, preferably ≥1.0 and ≤5.0 g/10 min, more preferably ≥1.0 and ≤4.0 g/10 min, even more preferably ≥2.0 and ≤3.5 g/10 min.

The polypropylene may for example have a molecular weight distribution (MWD), defined as $M_w/M_n$, of ≥2.5 and ≤8.0, preferably ≥4.0 and ≤6.0. Wherein $M_w$ is the weight average molecular weight and $M_n$ is the number average molecular weight. $M_w$ and $M_n$ are determined in accordance with ASTM D6474 (2012). The polypropylene may for example have an $M_w$ of >200 and <800 kg/mol. The polypropylene may for example have an $M_n$ of >80 and <320 kg/mol.

The polypropylene may for example have a xylene soluble fraction (XS) of ≥5.0 wt %, preferably ≤3.0 wt %, such as ≥1.0 and ≤5.0 wt %, or ≥1.0 and ≤3.0 wt %. The XS fraction is determined in accordance with ASTM D5492 (2010).

The polypropylene may be a polypropylene homopolymer or a polypropylene copolymer. The polypropylene may for example be a copolymer of propylene and one or more comonomer selected from ethylene, 1-butene, 4-methyl-1-pentene, 1-hexene or 1-octene. The polypropylene may for example be a copolymer of propylene and ethylene. The polypropylene may for example be a copolymer of propylene, ethylene and a further comonomer selected from 1-butene, 4-methyl-1-pentene, 1-hexene or 1-octene. The polypropylene may for example comprise ≥80.0 wt % of polymeric moieties derived from propylene, preferably ≤90.0 wt %, more preferably ≥95.0 wt %, even more preferably ≤98.0 wt %. The polypropylene may for example comprise ≥0.5 and ≤5.0 wt % of polymeric moieties derived from one or more comonomer selected from ethylene, 1-butene, 4-methyl-1-pentene, 1-hexene or 1-octene, preferably ≥1.0 and ≤3.0 wt %. The polypropylene may for example comprise 0.5 and 5.0 wt % of polymeric moieties derived from ethylene, preferably ≥1.0 and ≤3.0 wt %. The polypropylene may for example comprise ≥90.0 wt % of polymeric moieties derived from propylene and ≥0.5 and ≤5.0 wt % of polymeric moieties derived from ethylene, preferably ≥1.0 and ≤3.0 wt %.

In a certain embodiment, the invention also relates to a process for manufacturing of a package, comprising the steps in this order of:
 (a) providing a polypropylene sheet;
 (b) introducing one or more groove(s) into the polypropylene sheet on a bottom surface of the sheet;
 (c) forming at least two cavities into the polypropylene sheet by thermoforming, wherein the cavities protrude from the sheet from said top surface toward the bottom surface;
 (d) filling the cavities with a product, for example a foodstuff product; and
 (e) sealing the package by placing a film onto the top surface of the film and adhering the film onto said top surface so that each cavity is sealed.

The process may in a certain embodiment, subsequent to step (e), involve a step (f) of introducing one or more groove(s) into the polypropylene sheet on a top surface of the sheet, wherein the groove(s) are positioned opposite of the groove(s) introduced in step (b).

The invention will now be illustrated by the following non-limiting examples.

EXAMPLE 1

A sheet having a length of 10 cm and a width of 10 cm was compression moulded from SABIC PP500P polypropylene, having a thickness of 2000 Grooves A, B and C, having a length of 10 cm, were cut into the sheet parallel to the short side of the sheet, spaced 2.5 cm apart, on a bottom surface of the sheet. Groove A had a depth of 75% of the thickness of the sheet, groove B 50%, and groove C 25%. When bending the sheet in the direction of the bottom surface, that is in the direction of closing the grooves (such as depicted in FIG. 3.1), the sheet did not snap at any of grooves A, B or C. When bending the sheet in the opposite direction, that is towards the top surface or in the direction of opening the grooves (such as depicted in FIG. 3.2), the sheet snapped consistently and predictably along grooves A, B, and C. This demonstrates that the arrangement according to the present invention, that is a polypropylene sheet comprising grooves at the side of the sheet opposite to the direction of snapping, allows for predictable and desirable snapping of a sheet by hand to allow separating segments of the sheet.

EXAMPLE 2

A sheet having a length of 10 cm and a width of 5.2 cm was compression moulded from SABIC PP500P polypropylene, having a thickness of 2000 μm. Grooves were cut into the sheet parallel to the short side of the sheet, on both the bottom surface and the top surface of the sheet, opposite each other (such as depicted in FIG. 3.3). The grooves each had a depth of 25% of the thickness of the sheet. When bending the sheet, it snapped consistently and predictably along the grooves.

EXAMPLE 3

A 12.6 cm square sheet was cut from an extruded sheet of SABIC PP500P polypropylene, having a thickness of 1200 μm. Two perpendicular, intersecting grooves were cut through the centre of the sheet, to a depth of 70% of the thickness, into the bottom surface of the sheet. Upon bending the sheet in the direction of the bottom surface (FIG. 3.1), this did not result in snapping. Upon bending the sheet opposite to the bottom surface, that is in the direction of the top, non-grooved surface (FIG. 3.2), predictable snapping along the grooves occurred. The crack propagated along the whole groove length of 12.6 cm.

EXAMPLE 4

Three sheets in accordance with example 3 were produced from 1200 μm thickness extruded sheets of SABIC PP500P polypropylene comprising 3 wt % calcium carbonate (4A), 8 wt % calcium carbonate (4B) and 30 wt % calcium carbonate (4C), respectively. In the same way as in example 4, grooves were cut into the sheets. When the sheets were bent in the direction towards the top surface (FIG. 3.2), the sheets snapped along the grooves even more accurately that in the case of example 3. However, the sheet 4C had a brown colour, and no cavities could be introduced by thermoforming. This demonstrates that introduction of a certain fraction, such as ≥2.0 and ≤20.0 wt %, of an inorganic filler, such as calcium carbonate, allows for retaining thermoformability and contributes to the accuracy of crack propagation during snapping of the sheet into segments.

EXAMPLE 5

The following polypropylene sheet composition is suitable for the invention:
 SABIC PP528K Propylene Irganox 1010: 0.05 w %
Irgafos 168: 0.1 w %
Calcium Stearate: 0.06 w %
HPN68L: 0.05 w %

The sheet have has a melt mass-flow rate as determined in accordance with ASTM D1238 (2013) at 230° C. under a load of 2.16 kg of 3.0 g/10 min and a xylene soluble fraction (XS) as determined in accordance with ASTM D5492 (2010) of 3.5 wt %.

EXAMPLE 6

The following polypropylene sheet composition is suitable for the invention:
SABIC PP522K Propylene
Irganox 1010: 0.05 wt %
Irgafos 168: 0.1 wt %
DHT4V: 0.027 wt %
HPN68L: 0.04 wt %

The sheet have has a melt mass-flow rate as determined in accordance with ASTM D1238 (2013) at 230° C. under a load of 2.16 kg of 3.0 g/10 min and a xylene soluble fraction (XS) as determined in accordance with ASTM D5492 (2010) of 3.5 wt %.

EXAMPLE 7

The following polypropylene sheet composition is suitable for the invention:
SABIC PP5271K Propylene
Irganox 1010: 0.05 wt %
Irgafos 168: 0.1 wt %
DHT4A: 0.027 wt %
NA21: 0.08 wt %

The sheet have has a melt mass-flow rate as determined in accordance with ASTM D1238 (2013) at 230° C. under a load of 2.16 kg of 3.0 g/10 min and a xylene soluble fraction (XS) as determined in accordance with ASTM D5492 (2010) of 2.4 wt %.

The invention claimed is:

1. A multi-cup arrangement comprising a polypropylene sheet, wherein the polypropylene sheet comprises at least two cavities, the cavities each protruding from the sheet from a top surface toward a bottom surface of the sheet, wherein the cavities are separated from each other via one or more spacer area(s) on the sheet, wherein the spacer area(s) each comprise one or more groove(s) on the bottom surface of the sheet that are positioned to allow the sheet to be broken along the groove by bending the sheet towards the top surface, wherein the grooves are positioned to divide the sheet into multiple segments, each segment comprising one or more cavities, wherein each of the groove(s) has a maximum depth of ≥25% and ≤80% with regard to the thickness of the polypropylene sheet,
wherein the polypropylene sheet comprises between 0.04 wt % to 0.08 wt % of the advanced nucleating agent (1R,2R,3S,4S)-bicyclo[2.2.1]heptane-2,3-dicarboxylic acid, disodium salt, with regard to the total weight of the polypropylene sheet; and
wherein the polypropylene in the polypropylene sheet consists of polypropylene homopolymer having a molecular weight distribution (MWD), defined as Mw/Mn, of ≥2.5 and ≤8.0, wherein Mw and Mn are determined in accordance with ASTM D6474 (2012).

2. The multi-cup arrangement according to claim 1, further comprising groove(s) on the top surface positioned opposite the groove(s) on the bottom surface.

3. The multi-cup arrangement according to claim 1, wherein the cavities are formed by thermoforming.

4. The multi-cup arrangement according to claim 1, wherein the polypropylene sheet comprises at least 70.0 wt % of polypropylene with regard to the total weight of the sheet.

5. The multi-cup arrangement according to claim 1, wherein the polypropylene has a melt mass-flow rate as determined in accordance with ASTM D1238 (2013) at 230° C. under a load of 2.16 kg of ≥1.0 g/10 min and ≤10.0 g/10 min.

6. The multi-cup arrangement according to claim 1, wherein the polypropylene sheet has a thickness of ≥500 μm and ≤2500 μm.

7. The multi-cup arrangement according to claim 1, wherein each of the groove(s) has a width at the surface of the sheet of ≥100 μm and ≤250 μm.

8. The multi-cup arrangement according to claim 1, wherein each of the groove(s) are straight lined grooves.

9. The multi-cup arrangement according to claim 1, wherein the polypropylene sheet comprises ≥2.0 and ≤20.0 wt % of inorganic filler, with regard to the total weight of the polypropylene sheet.

10. A package comprising the multi-cup arrangement of claim 1.

11. The multi-cup arrangement of claim 1:
wherein the polypropylene sheet has a thickness of ≥500 μm and ≤2500 μm and each of the groove(s) has a width at the surface of the sheet of ≥100 μm and ≤250 μm; and
wherein the polypropylene sheet comprises
at least 70 wt % of polypropylene with regard to the total weight of the sheet.

12. The multi-cup arrangement according to claim 1, wherein the polypropylene has a xylene soluble fraction (XS) of ≤5.0 wt %, as determined in accordance with ASTM D5492 (2010).

13. The multi-cup arrangement of claim 1:
wherein the polypropylene sheet has a thickness of ≥500 μm and ≤2500 μm and each of the groove(s) has a width at the surface of the sheet of ≥100 μm and ≤250 μm; and
wherein the polypropylene sheet comprises, with regard to the total weight of the polypropylene sheet:
at least 70 wt % of polypropylene;
≥2.0 and ≤20.0 wt % of inorganic filler comprising at least one of calcium carbonate, titanium dioxide, or talc; and
less than or equal to 1.0 wt % of additives.

14. A polypropylene sheet for preparing a thermoformed object comprising a top surface and a bottom surface, wherein the sheet comprises one or more groove(s) on the bottom surface that are positioned to allow the sheet to be broken along the groove by bending the sheet towards the top surface, wherein each of the groove(s) has a maximum depth of ≥40% and ≤80% with regard to the thickness of the polypropylene sheet, wherein the polypropylene sheet comprises between 0.04 wt % to 0.08 wt % of the advanced nucleating agent (1R,2R,3S,4S)-bicyclo[2.2.1]heptane-2,3-dicarboxylic acid, disodium salt, with regard to the total weight of the polypropylene sheet, and
wherein the polypropylene in the polypropylene sheet consists of polypropylene homopolymer having a molecular weight distribution (MWD), defined as Mw/Mn, of ≥2.5 and ≤8.0, wherein Mw and Mn are determined in accordance with ASTM D6474 (2012).

15. The polypropylene sheet according to claim 14, wherein the sheet has a thickness of >500 and <2500 μm.

16. The polypropylene sheet according to claim 14, wherein each of the groove(s) has a width at the surface of the sheet of ≥100 μm and ≤250 μm.

17. The polypropylene sheet according to claim 14, wherein the sheet comprises least 70.0 wt % of polypropylene with regard to the total weight of the sheet.

18. A process for manufacturing of a package, comprising the steps in this order of:
   (a) providing a polypropylene sheet optionally comprising between 0.04 wt % to 0.08 wt % of advanced nucleating agents;
   (b) introducing one or more groove(s) into the polypropylene sheet on a bottom surface of the sheet;
   (c) forming at least two cavities into the polypropylene sheet by thermoforming, wherein the cavities protrude from the sheet from top surface toward the bottom surface;
   (d) filling the cavities with a product, for example a foodstuff product; and
   (e) sealing the package by placing a film onto the top surface of the film and adhering the film onto said top surface so that each cavity is sealed,
   wherein the polypropylene in the polypropylene sheet consists of polypropylene homopolymer having a molecular weight distribution (MWD), defined as Mw/Mn, of ≥2.5 and ≤8.0, wherein Mw and Mn are determined in accordance with ASTM D6474 (2012); and
   wherein the polypropylene sheet comprises between 0.04 wt % to 0.08 wt % of the advanced nucleating agent (1R,2R,3S,4S)-bicyclo[2.2.1]heptane-2,3-dicarboxylic acid, disodium salt, with regard to the total weight of the polypropylene sheet.

19. The process for manufacturing of a package according to claim 18, wherein the polypropylene has a xylene soluble fraction (XS) of ≤5.0 wt %, as determined in accordance with ASTM D5492 (2010).

* * * * *